United States Patent
Hines et al.

(10) Patent No.: US 6,236,185 B1
(45) Date of Patent: May 22, 2001

(54) COMPRESSED AIR POWER SUPPLY/ RECHARGEABLE BATTERY PACK

(75) Inventors: Mike Hines; Vance Carolin; Steve J. Pick, all of Polson, MT (US)

(73) Assignee: Technical and Management Services Corporation, Calverton, MD (US)

( * ) Notice: Subject to any disclaimer, the term of this patent is extended or adjusted under 35 U.S.C. 154(b) by 0 days.

(21) Appl. No.: 09/493,101

(22) Filed: Jan. 28, 2000

(51) Int. Cl.[7] .................................................. H01M 10/46
(52) U.S. Cl. ............................................ 320/101; 320/104
(58) Field of Search ................................. 320/101, 104, 320/123, 121

(56) References Cited

U.S. PATENT DOCUMENTS

| | | | |
|---|---|---|---|
| 4,344,138 | 8/1982 | Frasier | 701/70 |
| 5,267,473 * | 12/1993 | Bezos et al. | 73/129 |
| 5,796,240 * | 8/1998 | Saito et al. | 322/10 |
| 6,005,372 * | 12/1999 | Kouwa et al. | 320/104 |
| 6,054,838 * | 4/2000 | Tsatsis | 320/101 |

* cited by examiner

*Primary Examiner*—Peter S. Wong
*Assistant Examiner*—Lawrence Luk
(74) *Attorney, Agent, or Firm*—Dickstein Shapiro Morin & Oshinsky LLP

(57) ABSTRACT

A self-charging continuous EOT power supply/battery pack operates from excess air pressure available in a train's air system. An electric generator is driven by compressed air from the locomotive that is transmitted through the air brake system of the train. The generated electricity is input to a circuit card assembly that regulates the output voltage and generator speed. The regulated voltage is supplied to the EOT electronics and also to a storage battery to recharge the storage battery, which provides peak operating power as well as back-up power if the generating system is inoperable.

18 Claims, 3 Drawing Sheets

COMPRESSED AIR POWER SUPPLY/ RECHARGEABLE BATTERY PACK

BACKGROUND OF THE INVENTION

1. Field of the Invention

The present invention relates generally to power supplies/ battery packs and more particularly to a compressed air powered power supply/self-charging battery pack for use in a railroad End of Train (EOT) unit or other electrical products where suitable compressed air is available.

2. Description of the Related Art

Within the railroad industry, End-of-Train (EOT) units coupled to the last car of a train are extensively used to monitor operating characteristics of the train. Information is typically transmitted to equipment, usually located in the locomotive, where it is processed and used for operation of the train.

Conventional EOT devices are currently powered by replaceable rechargeable battery cells, such as for example Nickel/Cadmium or sealed lead acid batteries. FIG. 1 illustrates in block diagram form a railroad train 10 with an EOT unit 12. Train 10 includes a locomotive unit 14. An air brake pipe 26 extends through cars 18 to the EOT unit 12. EOT unit 12 monitors the pressure in the air brake pipe 26 via transducer 28 and transmits this information, as well as other information, via transmitter 24 to locomotive unit 14. Battery pack 20 provides power for the EOT unit 12.

There are problems, however, with the use of battery cells, such as battery pack 20, in EOT units. Typically, when the battery cells become discharged, the EOT unit is rendered inoperable until the battery cells are replaced by charged cells, or are recharged by connection to an external power source. In some instances, the battery cells may have to be replaced or recharged in remote places, requiring the railroad to have batteries or battery chargers located throughout the railroad. The resulting down time of the EOT unit results in increased cost of operation for the railroad.

Thus, there exists a need for a power supply for use in an EOT unit that requires minimal maintenance and can provide continuous operation, thereby reducing EOT down time and increasing efficiency of the railroad.

SUMMARY OF THE INVENTION

The present invention overcomes the problems associated with the prior art and provides a continuously self-charging battery pack/power supply that operates from air pressure available in a train's air system.

In accordance with the present invention, an electrical generator is driven by compressed air from the locomotive air compressor and transmitted via the air brake system of the train. The generated electricity is input to a circuit card assembly that regulates the output voltage and generator speed. The regulated voltage is supplied to the EOT electronics and also to a storage battery to recharge the storage battery, which provides peak operating power as well as back-up power if the generating system is inoperable.

These and other advantages and features of the invention will become apparent from the following detailed description of the invention which is provided in connection with the accompanying drawings.

DETAILED DESCRIPTION

Figure 1:
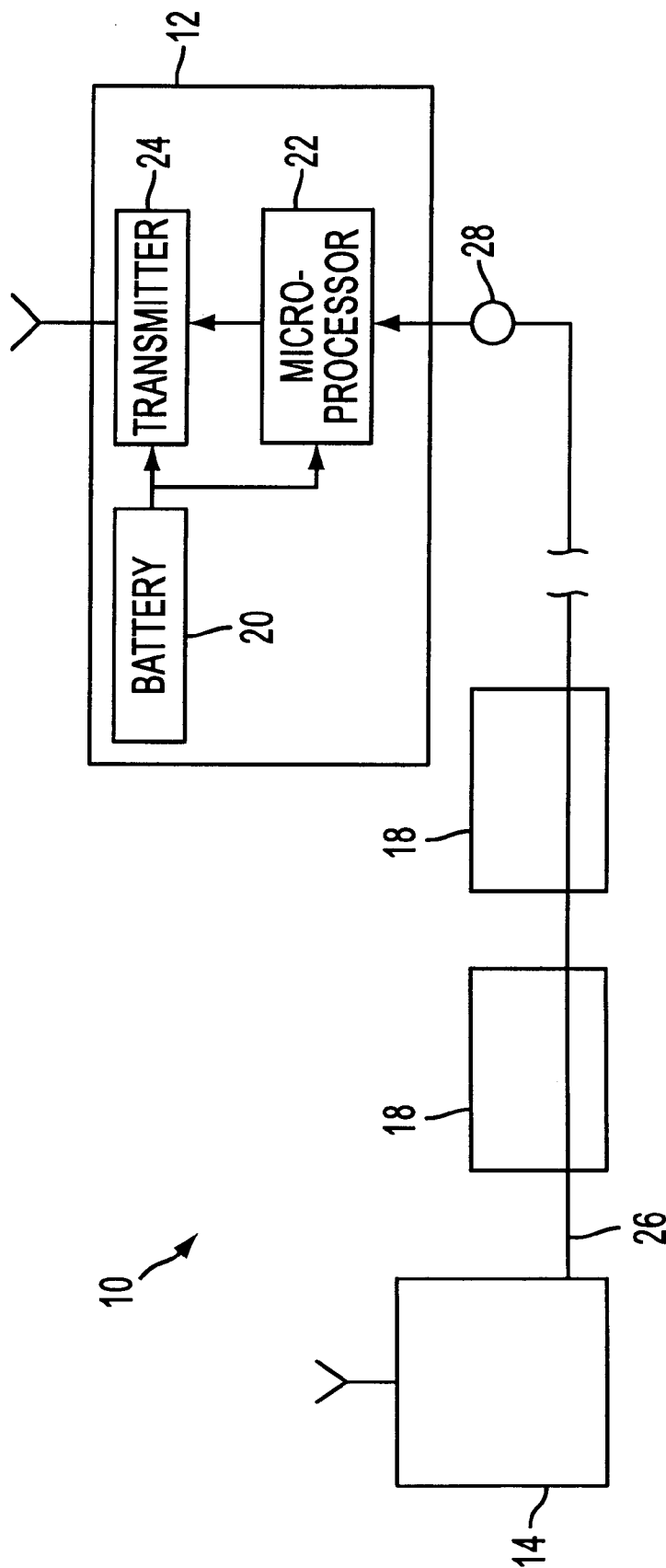
FIG. 1 illustrates, in block diagram form, a railroad train with an EOT unit.

The present invention will be described in connection with preferred embodiments. Other embodiments may be utilized and structural changes may be made without departing from the spirit or scope of the present invention. Like items are referred to by like reference numerals throughout the description.

In accordance with the present invention, an electrical generator is driven by air from the locomotive air compressor that is transmitted through the air brake system of the train. The generated electricity is input to a circuit card assembly that regulates the output voltage. The regulated voltage is supplied to the EOT electronics and also to a storage battery to recharge the storage battery, which provides additional power during periods of peak operation and back-up power if the generating system is inoperable.

Figure 2:
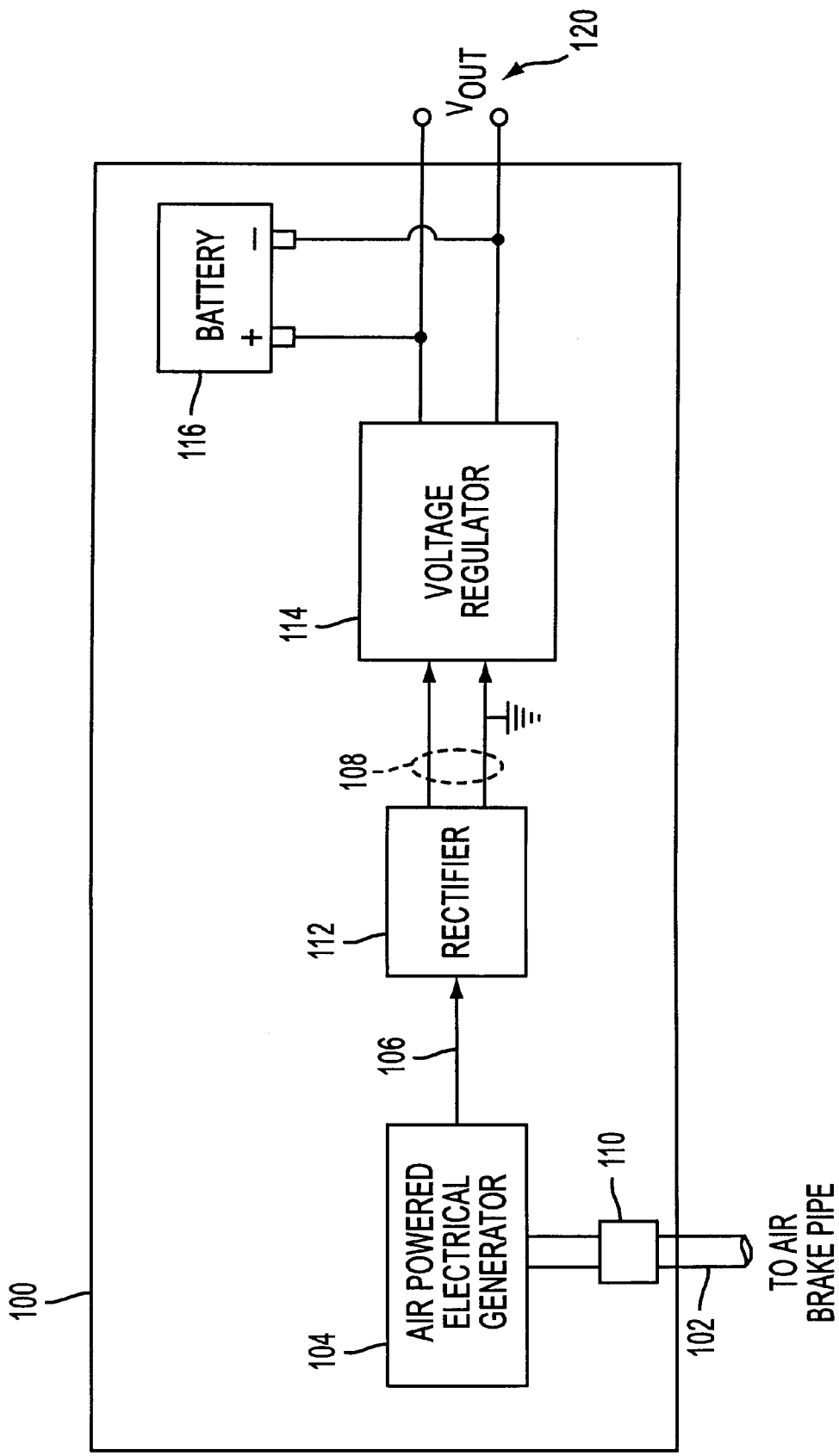
FIG. 2 illustrates, in block diagram form, a power supply/ battery charger in accordance with the present invention.

FIG. 2 illustrates in block diagram form a power supply/ battery charger 100 in accordance with the present invention. Power supply/battery charger 100 includes an air powered electrical generator 104 coupled to the air brake pipe 26 by a hose 102. Optionally, an air filter/condensor 110 may be provided to remove water or impurities from the air within the air system before being input to generator 104. The generator 104 may be any suitable air-driven generator known in the art. The air powered electrical generator 104 uses a minimal amount of air from the air brake system to generate a sufficient amount of electrical power to run an EOT, such as for example the microprocessor 22 and transmitter 24 illustrated in FIG. 1, or other relatively low power electronic devices. Preferably, the air consumption under normal operation is less than 2 CFM at 90 psi. It is also preferable that the generator 104 generate electricity as long as the air pressure exceeds 80 psi.

The generated electricity from generator 104 is input to a rectifier 112 via line 106. Alternatively, rectifier 112 could be provided as part of generator 104, such as for example an air motor/alternator and rectifier combination or an air turbine/ alternator and rectifier combination. The rectifier 112 converts the AC signal from generator 104 into a DC voltage and outputs the DC voltage to voltage regulator 114 on line 108. Voltage regulator 114 regulates the DC voltage input from rectifier 112 and outputs voltage Vout 120, which is used to power the electrical/electronic components of the EOT unit. Preferably, voltage regulator 114 regulates Vout to 13.8V, with an output current capability of 180 mA continuous.

In accordance with the present invention, a storage battery 116 is also connected to Vout 120. Storage battery 116 is continuously recharged by Vout 120, and will provide power during peak operating periods and extend the source of normal operating current if power from the air generator system, including generator 104 and voltage regulator 114, is inoperable. The power supply/battery charger 100, with storage battery 116, is capable of peak currents up to 3 Amps. The peak current supplies power for EOT emergency features while the continuous current provides normal operating power. Since the battery 116 is continuously recharged during operation of the power supply/battery charger 100, the battery 116 does not need to be replaced with a new battery or connected to an external charging device as in the prior art, resulting in reduced maintenance and operation costs.

Figure 3:
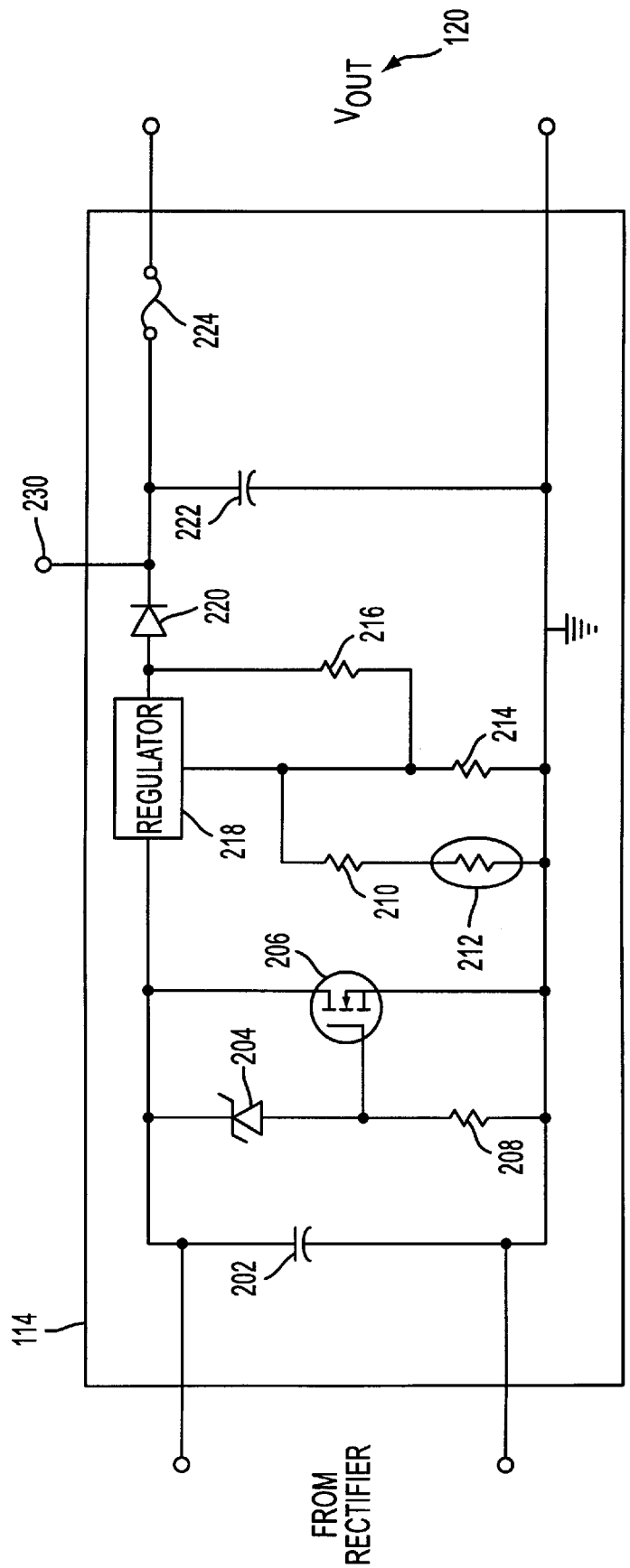
FIG. 3 illustrates, in schematic diagram form, an exemplary voltage regulator circuit that may be used with the power supply/battery charger of FIG. 2.

FIG. 3 illustrates in schematic diagram form an exemplary voltage regulator circuit 114 that may be used with the power supply/battery charger 100 of FIG. 2. The DC voltage from rectifier 112 is input to regulator 114. A capacitor 202 provides additional filtering of the DC signal from the rectifier. A voltage regulator chip 218, as is well known in the art, regulates the DC signal input from the rectifier to the desired voltage, such as for example 13.8 Volts. In accordance with the present invention, overspeed protection of the generator is provided by Zener diode 204, transistor 206 and resistor 208. These components 204,206 and 208 will automatically increase shunt load, when the external load is decreased, to prevent excessive speed of the generator 104. Temperature protection and feedback regulation are provided by resistors 210,214 and 216 and PTC 212. A diode 220 and capacitor 222 are provided to ensure a clean DC signal at Vout 120. A fuse 224 may be used to provide overcurrent protection for Vout 120. In addition, a test point 230 may be provided to allow measurement of the output voltage Vout 120.

Thus, in accordance with the present invention, power supply/battery pack 100 provides a continuous, maintenance-free source of electrical power for electronic devices such as an EOT unit by utilizing an electrical generator driven by compressed air from the train air system to generate electricity to supply power to the EOT electronics and also to recharge a storage battery, which provides peak power as well as back-up power if the generating system is inoperable.

While the power supply/battery charger 100 of the present invention has been described with respect to use in an EOT unit, the invention is not so limited and can be used in any application where there is a source of compressed air sufficient to run the compressed air powered generator 104.

Reference has been made to preferred embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A power supply for supplying power to an electronic device, said power supply comprising:
   a compressed air powered electric generator adapted for connection to an air line, said compressed air powered electric generator generating a voltage from air pressure in said air line and providing said voltage on an output; and
   a voltage regulator having an input connected to said output of said compressed air powered electric generator and an output adapted to be connected to said electronic device, said output of said voltage regulator being further adapted to be directly connected to a storage battery, said voltage regulator regulating said voltage generated by said compressed air powered electric generator and supplying said regulated voltage directly to said electronic device to continuously power said electronic device and to said storage battery to continuously charge said storage battery, said storage battery providing peak power for said electronic device as well as back-up power if said compressed air powered electric generator is inoperable.

2. The power supply according to claim 1, further comprising:
   a rectifier circuit commented between said compressed air powered electric generator and said voltage regulator.

3. The power supply according to claim 1, wherein said regulated voltage is about 13.8 volts.

4. The power supply according to claim 1, wherein said compressed air powered electric generator consumes air from said air line at less than about 2 CFM at about 90 psi.

5. The power supply according to claim 1, wherein said compressed air powered electric generator generates said voltage as long as air pressure in said air line exceeds about 80 psi.

6. The power supply according to claim 1, wherein said voltage regulator further comprises:
   an overspeed protection circuit for regulating a speed of said compressed air powered electric generator.

7. An end of train unit for a railroad train, said end of train unit comprising:
   at least one electrically operated end of train component; and
   a power supply for supplying power to said at least one electrically operated end of train component, said power supply comprising:
      a compressed air powered electric generator connected to an air line of said railroad train, said compressed air powered electric generator generating a voltage from air pressure in said train air line and providing said voltage on an output;
      a voltage regulator having an input connected to said output of said compressed air powered electric generator and an output connected to said at least one electrically operated end of train component; and
      a storage battery connected directly to said output of said voltage regulator and directly to said at least one electrically operated end of train component;
   said voltage regulator regulating said voltage generated by said compressed air powered electric generator and supplying said regulated voltage directly to said at least one electrically operated end of train component to continuously power said at least one electrically operated end of train component and to said storage battery to continuously charge said storage battery, said storage battery providing peak power for said at least one electrically operated end of train component as well as back-up power if said compressed air powered electric generator is inoperable.

8. The end of train unit according to claim 7, said power supply further comprising:
   a rectifier circuit connected between said compressed air powered electric generator and said voltage regulator.

9. The end of train unit according to claim 7, wherein said regulated voltage is about 13.8 volts.

10. The end of train unit according to claim 7, wherein said air powered electric generator consumes air from said air line at less than about 2 CFM at about 90 psi.

11. The end of train unit according to claim 7, wherein said air powered electric generator generates said voltage as long as air pressure in said air line exceeds about 80 psi.

12. The end of train unit according to claim 7, wherein said voltage regulator further comprises:
   an overspeed protection circuit for regulating a speed of said compressed air powered electric generator.

13. A method for powering at least one electrically operated component, said method comprising the steps of generating a voltage from air pressure in an air line;

regulating said generated voltage to provide a regulated voltage;

supplying said regulated voltage directly to said at least one electrically operated component to continuously power said at least one electrically operated component; and supplying said regulated voltage directly to a storage battery to continuously charge said storage battery, said storage battery being directly connected to said at least one electrically operated component to provide peak power for said at least one electrically operated component as well as back-up power if said voltage generation is inoperable.

14. The method according to claim 13, wherein said step of regulating further comprises:

regulating said generated voltage to about 13.8 volts.

15. The method according to claim 13, wherein said step of generating further comprises:

consuming less than about 2 CFM at about 90 psi from said air line to generate said voltage.

16. The method according to claim 13, wherein said step of generating further comprises:

generating a voltage if said air pressure in said air line exceeds approximately 80 psi.

17. The method according to claim 13, wherein said step of generating further comprises:

regulating a speed of a compressed air powered generator used to generate said voltage by automatically increasing a shunt load on said generator in response to a predetermined condition.

18. The method according to claim 17, wherein said predetermined condition includes decrease of an external load in said compressed air powered generator.

* * * * *